United States Patent [19]

von Ahrens

[11] Patent Number: 4,611,830
[45] Date of Patent: Sep. 16, 1986

[54] PARTIALLY CONSUMABLE SPACER CHILL RINGS AND THEIR USE IN WELDING PIPE JOINTS

[76] Inventor: Roger W. von Ahrens, Avenel, N.J.

[21] Appl. No.: 587,492

[22] Filed: Mar. 9, 1984

Related U.S. Application Data

[63] Continuation-in-part of Ser. No. 241,715, Mar. 9, 1981, abandoned.

[51] Int. Cl.[4] ............................................. F16L 13/02
[52] U.S. Cl. ..................................... 285/22; 285/286; 219/60 R; 228/250
[58] Field of Search .................. 285/22, 286; 228/250, 228/249, 245; 219/60 R, 61

[56] References Cited

U.S. PATENT DOCUMENTS

| | | | |
|---|---|---|---|
| 1,453,343 | 5/1923 | Fay | 285/22 X |
| 1,499,581 | 7/1924 | Kibele | 285/286 |
| 1,980,530 | 11/1934 | Hutchison | 285/286 X |
| 1,981,850 | 11/1934 | Fisher | 285/22 X |
| 1,987,341 | 1/1935 | Kachel | 285/22 X |
| 2,366,579 | 1/1945 | von Ahrens | 285/22 |
| 2,764,426 | 9/1956 | von Ahrens | 285/22 |
| 2,792,490 | 5/1957 | Risch et al. | 285/22 X |
| 3,033,145 | 5/1962 | Thielsch | 285/22 X |
| 3,151,888 | 10/1964 | Wagner | 285/22 |
| 3,770,302 | 11/1973 | Hallenbeck | 285/22 |

FOREIGN PATENT DOCUMENTS 202285  4/1939  Switzerland ................ 285/286

Primary Examiner—Thomas F. Callaghan

[57] ABSTRACT

A partially consumable spacer chill or welding ring includes a generally cylindrical non-consumable base metal ring having an outside diameter of such a size as to snugly fit the inside diameter of the pipe end to be welded. A circular consumable filler metal spacer ring is medially attached to the outer periphery of the base metal ring and extends peripherally radially outwardly to function as a spacing device between adjacent ends of two lengths of pipe to be joined. The consumable spacer ring may be affixed to the base metal ring in a plurality of circularly offset locations by spot welding or may be press-fitted in an alignment groove in the base ring. The consumable spacer ring becomes filler metal during welding.

17 Claims, 10 Drawing Figures

PARTIALLY CONSUMABLE SPACER CHILL RINGS AND THEIR USE IN WELDING PIPE JOINTS

CROSS REFERENCE TO A RELATED APPLICATION

This application is a continuation-in-part of U.S. patent application Ser. No. 06/241,715, filed Mar. 9, 1981 and now abandoned.

BACKGROUND OF THE INVENTION

1. Field of the Invention

The present invention relates generally to the field of welding chill rings for joining adjacent lengths of metallic pipe, and more particularly, is directed to novel partially consumable spacer chill rings and a method for welding pipe joints therewith.

2. Description of the Prior Art

In the welding industry, it is presently the usual practice to employ a chill ring at each pipe joint to facilitate the introduction of filler metal from a separate source during the first root pass. Spacer pins are usually employed in conjunction with the chill ring to precisely set the distance between adjacent pipe ends for better control and reliability in the pipe joining operations. In one known process, a gas is introduced interiorly of the pipe during the welding procedures and upon completion of the joint; the pipe must be purged by employing auxiliary equipment.

The existing methods of pipe welding and most existing chill rings which are currently available to aid in the fabrication of pipe joints frequently result in defective welds which can be caused by such hard to control imperfections as burn through, the formation of icicles and slag interiorly of the pipe, or in porosity in the weld itself. Additionally, most prior techniques involved manual welding procedures, which are always subject to human error, during welding of the first root pass due to the wide variance possible in the welder's flow of filler metal.

In an effort to reduce the number of defective joints resulting from the use of prior chill rings and manual welding techniques, other prior workers in the art have developed "ridge" type machined chill rings to bring greater reliability to the welded pipe joint, and to reduce costs by diminishing the number of rejects. However, the costs of producing the "ridge" type machined ring itself contributed to the increased overall cost of the finished welded pipe junction. Presently available pipe joining welding products or chill rings, are used to assist in aligning the pipe ends, together with a spacer pin or pins, to create a root gap for initiation of the welded joint, for which the separate introduction of filler metal during the first root pass is essential.

Presently available chill rings are in general use to provide spacing pins or nubs for root gap spacing purposes in various welding processes. A root gap of perhaps 3/16 of an inch or 1/18 of an inch was previously set by the pins and then filler metal was added during the first root pass. When the welding element, stick, rod or wire was consumed, manual operations had to be discontinued and then restarted after a new stick was employed or the welder's position changed. This was a time consuming, manual process with the inherent possibility of a defect occurring in the weld, due both to the manual operations and to the intermittent nature of the weld.

Although current available products can provide the required alignment and root gap spacing functions, none eliminate the need for separate addition of filler metal.

It is apparent from the foregoing that a need remains in the art for improved chill rings which facilitate and simplify the welding operation.

It is a primary object of the present invention, therefore, to provide improved chill rings which reduce or eliminate defective welds caused by burn through, the formation of icicles and slag outside the pipe, or porosity in the weld.

It is another object of the invention to provide improved chill rings which may be used with automatic welding heads and thus, prevent defective welds due to human error.

It is still another object of the invention to obviate the need to employ expensive machined "ridge" type chill rings.

It is another object of the present invention to provide an improved partially consumable spacer chill ring which will provide filler metal during the welding operation and thus reduce both the incidence of defective welds and welding time.

It is another object of the present invention to provide a novel partially consumable spacer chill ring including a non-consumable cylindrical base metal chill ring and an annular consumable filler metal spacer ring affixed to the outer periphery of the base metal ring; the latter providing filler metal during welding.

It is another object of the present invention to provide a novel partially consumable spacer chill or welding ring comprising a cylindrical base metal chill ring and a consumable spacer ring affixed to the outer periphery of the base metal ring at a plurality of circularly offset locations.

It is another object of the present invention to provide a novel partially consumable spacer chill ring that is simple in design, inexpensive in manufacture, and trouble-free when in use.

It is still another object of the invention to provide a novel partially consumable spacer chill ring including a cylindrical base metal chill ring having an annular alignment groove around the outer periphery thereof, and an annular consumable filler metal spacer ring fitted on said annular alignment groove of the base ring.

It is another object of the present invention to provide a novel, partially consumable spacer chill ring comprising a non-consumable cylindrical base metal ring having its inner land provided with upstream and downstream bevels and having a consumable circular ring affixed about the chill ring outer land and wherein the chill ring and the spacer ring are provided with aligned splits.

It is another object of the present invention to provide a novel, partially consumable spacer chill ring comprising a non-consumable cylindrical base ring, an annular consumable spacer ring affixed to the outer periphery of the base ring and wherein either or both of the base ring and the spacer ring may be split.

It is another object of the present invention to provide a novel method of welding a pipe joint which requires no spacer pins and employs no purging gases or purging dams.

It is another object of the present invention to provide a novel, partially consumable spacer chill ring which eliminates the necessity of employing filler metal during the first root pass, whereby a completed weld may be produced in a single pass.

SUMMARY OF THE INVENTION

The foregoing and other objects of the invention, which will become apparent below, are achieved by providing composite, partially consumable spacer chill rings comprising a non-consumable base metal chill ring and a consumable spacer ring, which provides filler metal during the welding operation; and a method for welding pipe joints therewith.

More specifically, the partially consumable spacer chill rings of the present invention include a non-consumable cylindrical base metal chill ring having its outer land diameter corresponding to the inner diameter of the pipe. The non-consumable metal chill ring may be continuous or may be split, depending upon such factors as tolerances of the job, materials, and the like. The additional thickness of the chill ring within the internal diameter of the pipe is relatively small, for example from 3/32 of an inch to ⅛ of an inch for pipe sizes of ¾ inch and up, to thereby offer a construction having substantially incalculable, negligable effect upon the flow of liquid through the pipe.

Preferably the leading and trailing edges of the internal land of the chill rings are circularly beveled forwardly and rearwardly, for example, by providing a fifteen degree internal bevel on either side of a central flat internal land, to provide a construction offering a minimal or negligable resistance to flow through the pipe.

The composite, partially consumable spacer chill rings comprise an annular consumable filler and spacer ring of metal compatible with the metal of the non-consumable base ring material and having an internal diameter to match the base metal chill ring outer diameter.

The consumable ring is centered upon the outer periphery of the base metal ring equidistant from the leading and trailing edges. The consumable spacer ring may be secured to the base metal chill ring by any suitable means. The consumable spacer filler metal ring is fabricated of metal which is also weldably compatible with the material of the pipe itself, whether carbon steel, chrome-molybdenum steels, stainless steels, or the like.

The consumable spacer ring may be provided in a continuous circular ring or the ring may be split. If a split consumable ring is employed with a split base metal chill ring, then the splits of the chill ring and the consumable insert preferably coincide and align to prevent warping.

EMBODIMENTS OF THE INVENTION

Figure 1:
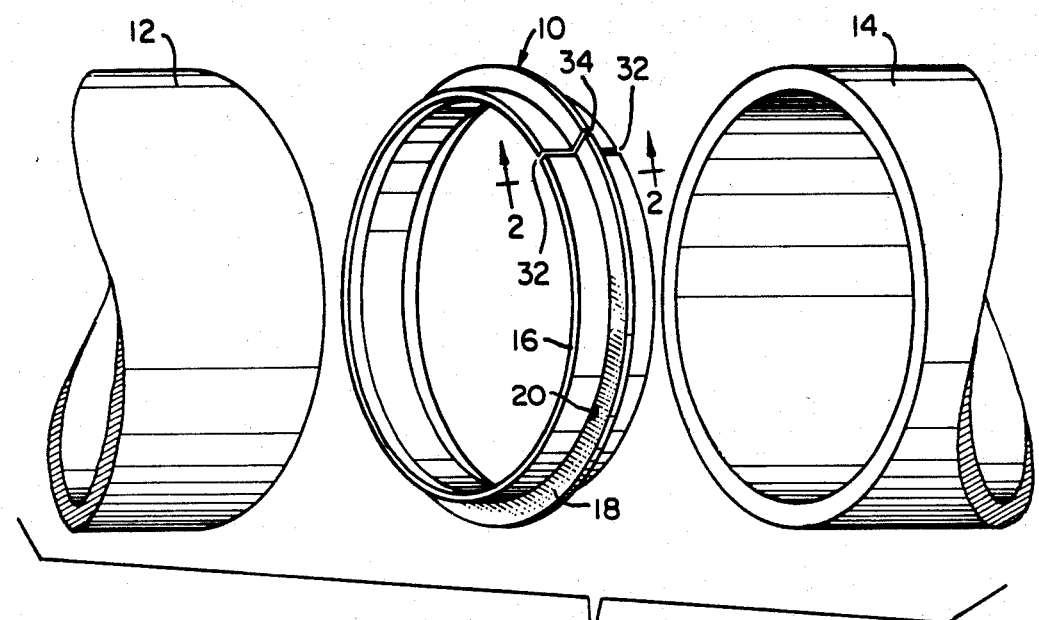
FIG. 1 is a perspective view of the consumable spacer chill ring showing the pipe ends to be connected in exploded relationship.

Although specific terms are used in the following description for the sake of clarity, these terms are intended to refer only to the particular structure of the invention selected for illustration in the drawings, and are not intended to define or limit the scope of the invention.

As employed herein the term "pipe" is defined to mean all tubular members whether of circular, oval, elliptical, square, rectangular, triangular, or other geometric cross section, and includes but is not limited to, pipes, tubes, fittings, valves and the like.

Referring now to the drawings, there is shown in FIG. 1 the consumable spacer chill ring 10 of the present invention interposed between the mating ends of adjacent lengths of metallic pipe 12, 14 to be secured together by a welded joint (not illustrated).

Figure 2:
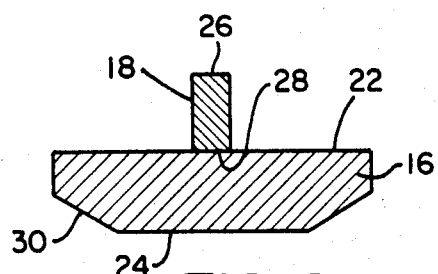
FIG. 2 is an enlarged, cross sectional view taken along line 2—2 on FIG. 1, looking in the direction of the arrows.

The composite, partially consumable, spacer chill ring 10, comprises generally a chill ring or non-consumable base metal ring 16 of generally cylindrical configuration having an outer diameter 22 of size to match the inner diameters of the adjacent pipe lengths 12, 14 for sliding engagement therewithin. As best seen in FIG. 2, a flat, internal land 24 is defined interiorly of the ring 16 by the upstream and downstream bevels 30. The circular bevels 30 preferably incline at fifteen degrees from the internal land 24 and are provided both upstream and downstream to minimize turbulence of fluid flow after fabrication of the welded joints in the pipeline.

Still referring to FIGS. 1 and 2, an annular consumable spacer ring 18 having inner diameter 28 corresponding to the outer diameter 22 of the base ring 16 is affixed medially to the base ring 16 by employing a plurality of circularly offset welds 20. The annular spacer ring 18 is intended to be consumed when the welded joint (not illustrated) between the adjacent pipe ends 12, 14 is fabricated. In the preferred embodiment, the spacer ring 18 conforms to the material of the adjacent pipes 12, 14 and preferably is equal in annular height to the pipe wall thickness.

Figure 3:
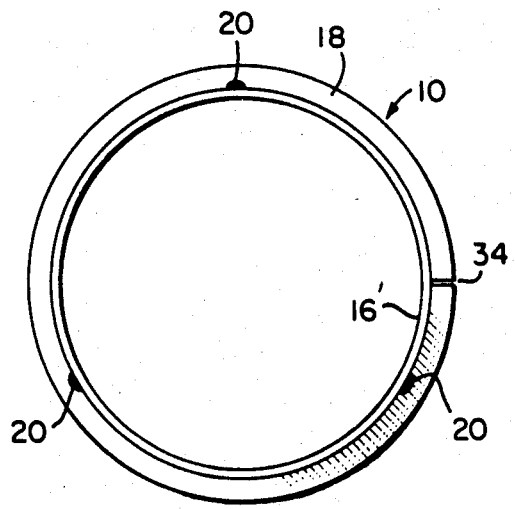
FIG. 3 is an elevational view of a first modified chill ring construction.
Figure 4:
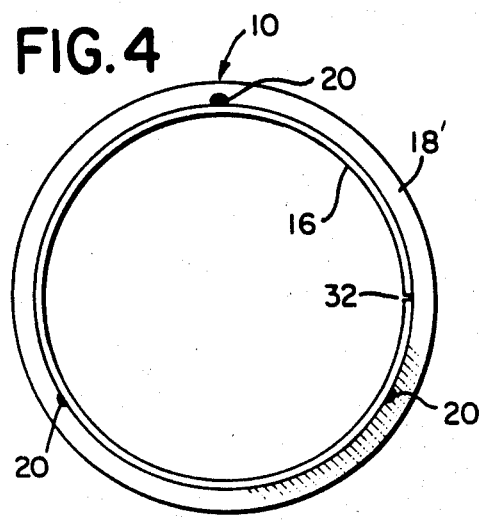
FIG. 4 is an elevational view of a second modified chill ring construction.

Referring now to FIGS. 1, 3 and 4, it is illustrated that either or both of the base ring 16 and the spacer ring 18 may be continuous and circular in configuration or either may be cut or split, depending upon job conditions. As seen in FIG. 1, the base ring 16 is cut to form a split opening 32 to provide a limited degree of flexibility in installation. The consumable spacer ring 18 is similarly split to provide a cut opening 34. Preferably, the split openings 32, 34 radially align for optimum reliability in use. Experimentation has shown that there is a possibility of warping in the base ring 16 when the openings 32, 34 do not align. In the modification of FIG. 3, the base ring 16 is illustrated as a continuous, cylindrical ring and the spacer ring 18 is provided with a split opening 34, a configuration that may prove advantageous under certain field conditions. In FIG. 4, a continuous, circular, annular consumable spacer ring 18 is illustrated affixed to a non-consumable base metal ring 16 which is provided with a split opening 32 in the manner above described in FIG. 1. The use of a continuous spacer ring 18 with a split base ring 16 may prove advantageous under certain conditions of size and materials.

Figure 5:
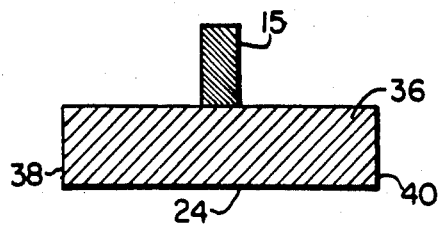
FIG. 5 is a cross sectional view similar to FIG. 2, showing a third modified chill ring construction.
Figure 6:
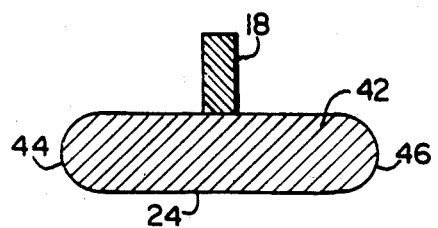
FIG. 6 is a cross sectional view similar to FIG. 2, showing a fourth modified chill ring construction.

In the embodiment illustrated in FIG. 5 a modified non-consumable base chill ring 36 is illustrated showing a ring of generally rectangular cross sectional configuration. The inner land 24 is defined between the square inner corners 38, 40. Such a construction may be efficiently employed in installations wherein a slight increase in turbulence in flow through the pipes 12, 14 will not be a problem. In FIG. 6, another modified base ring 42 is illustrated having a consumable spacer ring 18 affixed in the usual manner. The cylindrical base ring 42 is characterized by rounded leading and trailing edges 44, 46, a configuration which may prove advantageous in certain installations.

Figure 7:
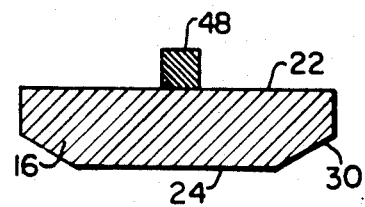
FIG. 7 is a cross sectional view similar to FIG. 2, showing a fifth modified chill ring construction.
Figure 8:
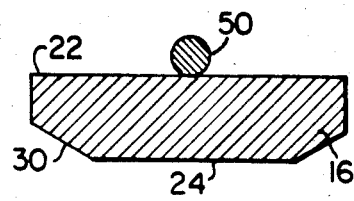
FIG. 8 is a cross sectional view similar to FIG. 2, showing a sixth modified chill ring construction.

Referring now to FIGS. 7 and 8, a base chill ring 16 similar to that illustrated in FIG. 2 is set forth having the inner or internal land 24 defined between the forward and rearward bevels 30. A square cross sectional spacer wire 48 is utilized in FIG. 7 to provide a spacer construction which employs less consumable material. In the embodiment of FIG. 8, the spacer wire, is of round cross sectional configuration. Both the square wire 48 and the round wire 50 can be affixed in circularly spaced locations to outer land 22 of the base ring 16 in known manner, for example, by welding.

Figure 9:
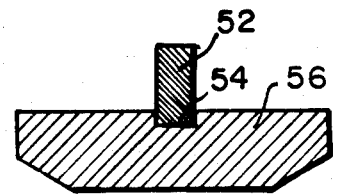
FIG. 9 is a cross sectional view of another embodiment of the invention similar to that of FIGS. 2 and 7 except that the consumable spacer ring is inserted in an annular alignment groove in the base metal chill ring.
Figure 10:
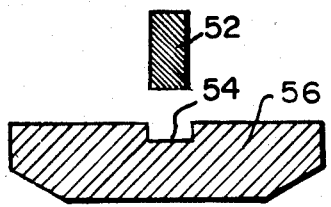
FIG. 10 is a view of the chill ring of FIG. 9 with the consumable spacer ring in exploded relation to the base metal chill ring and its annular alignment groove.

Another especially preferred embodiment of the invention is shown in FIGS. 9 and 10, which have distinct advantages in both manufacture and use. In this embodiment, the base metal chill ring 56 is provided with an annular alignment groove 54, preferably on the center line between the edges of the ring. This groove may be provided in any suitable manner known to the art as by machining or otherwise. The annular consumable spacer insert 52 is press fitted or otherwise inserted in the alignment groove 54 in the base ring 56. The alignment groove may suitably be from about 0.01 to about 0.02 inches in depth. The width of the groove is varied as desired depending on the shape of the consumable insert 52, which may take any suitable configuration as shown above; the alignment groove having a complementary shape. The groove 54 serves the dual function of receiving and anchoring the consumable insert 52 and aiding in aligning the pipe ends. The alignment groove also greatly facilitates the fit-up of the consumable spacer insert to the base metal chill ring. The consumable spacer may be anchored in the alignment groove by any suitable means known to the art to unite metal parts.

In use, when the chill ring 10 of the present invention is employed for welding a joint between adjacent pipe lengths 12, 14, the need for employing spacer pins and the necessity of adding filler metal during the welding of a first root pass is obviated. Additionally, the need for employing purging gases with purging dams can also be eliminated. The spacer ring 18 automatically spaces the adjacent ends of the pipes 12, 14 apart by the desired, optimum distance and in light or thin wall pipes, most frequently eliminates the need for added filler material. By employing the consumable ring 18 with 1/16 inch gap, a single pass with an automatic welding head can usually be employed to automatically provide an acceptably welded joint with substantially no rejects. By eliminating the employment of spacer pins, and by utilizing a consumable spacer ring, the welded joint can be provided in an automatic manner by employing an uninterrupted arc in a highly efficient and speedy manner. When employing prior art spacer pins and manual welding equipment to join three inch boiler tubing it was usual to require a considerable period of time, for example, approximately fifteen to twenty minutes or more to fabricate a one root pass welded joint. By employing the consumable spacer ring 18 which attached non-consumable base ring 16 of the present invention, the same joint can now be automatically fabricated using an automatic welding head in considerably less time.

The dimensions of the chill ring can vary widely depending upon the size and the material of the pipe being joined by welding. For example, with four inch NPS and smaller pipe sizes standard cross sectional dimensions of the chill ring could be 3/32 inches in thickness and ⅜ of an inch in width. By employing a fifteen degree internal bevel both upstream and downstream, a ⅜ inch internal diameter length can be provided. Preferably, the outer diameter is flat to conform to the internal diameter of the pipe itself. With five inch NPS and larger pipes, a base ring thickness of ⅛ of an inch by 1 inch in width has been found suitable. Again, when employing a fifteen degree internal bevel both upstream and downstream, a ⅜ inch flat land on the internal diameter has been successfully employed.

The dimensions of the consumable spacer insert ring are dependent upon the end land dimensions of the pipe being welded and annular consumable spacer rings having round, rectangular or other suitable cross-sectional dimensions of for example ⅛ inch high by 1/16 inch wide, 3/16 inches high by 1/16 inch wide, and 5/32 inches high by ⅛ inch wide have been successfully employed. As above set forth, the material of the consumable insert ring optimally should correspond to the material of the pipe being welded.

Although the invention has been described with reference to the particular embodiments herein set forth, it is understood that the present disclosure has been made only by way of example and that numerous changes in the details of construction may be resorted to without departing from the spirit and scope of the invention. Thus, the scope of the invention should not be limited by the foregoing specification, but rather only by the scope of the claims appended hereto.

What is claimed is:

1. A partially consumable spacer chill ring for welding a pair of adjacent pipe ends, comprising:
   a non-consumable, substantially annular, base metal ring having an outside diameter permitting a snug fit interiorly of the pipe ends to be welded, said non-consumable base metal ring being effectively continuous with at most a small transverse slit; and
   a consumable, substantially annular, filler metal spacer ring medially attached to the exterior of said base ring and projecting radially outwardly therefrom, for spacing apart said pipe ends and for welding said pipe ends together by supplying filler metal from said consumable spacer ring only to the weld during a first root pass of a welding operation, said consumable filler metal spacer ring being effectively continuous with at most a small transverse slit.

2. The chill ring of claim 1 wherein the base ring has a width greater than its depth.

3. The spacer chill ring of claim 1 wherein the base ring defines an internal land and an outer land in cross-section, the internal land being less in width than the outer land.

4. The spacer chill ring of claim 3 wherein the base ring has an internal periphery provided with an upstream bevelled surface, the upstream bevelled surface defining one end of the internal land.

5. The spacer chill ring of claim 4 wherein the internal periphery of the base ring is provided with a downstream bevelled surface, the downstream bevelled surface defining a second end of the internal land.

6. The spacer chill ring of claim 1 wherein the consumable spacer ring is affixed to the base ring by welds at spaced positions along the exterior of said base ring.

7. The spacer chill ring of claim 1 wherein the base ring includes a circumferential groove in the exterior surface thereof and the consumable spacer ring fits within said groove in said base ring.

8. The spacer chill ring of claim 1 wherein the pipe ends have a wall thickness, and wherein the spacer ring extends radially outwardly from the base ring through a distance substantially equal to the pipe end wall thickness.

9. The spacer chill ring of claim 1 wherein at least one of the consumable spacer ring and non-consumable base ring have a small transverse slit to provide a discontinuity therein.

10. The spacer chill ring of claim 9 wherein both the consumable spacer ring and non-consumable base ring have a small transverse slit in alignment with each other.

11. The spacer chill ring of claim 1 wherein the base ring defines an internal land and an outer land in cross-section, the internal land being substantially equal in width to the outer land.

12. The spacer chill ring of claim 11 wherein the internal land and outer land are joined by edges which define square corners.

13. The spacer chill ring of claim 11 wherein the internal land and outer land are joined by edges which define rounded corners.

14. The spacer chill ring of claim 1 wherein the spacer ring has a rectangular cross-sectional configuration.

15. The spacer chill ring of claim 1 wherein the spacer ring has a square cross-sectional configuration.

16. The spacer chill ring of claim 1 wherein the spacer ring has a round cross-sectional configuration.

17. A method of fabricating a welded pipe joint at mating ends of adjacent pipes, comprising the steps of:
inserting a non-consumable, substantially annular base metal ring within respective ends of the adjacent pipes, said non-consumable base metal ring being effectively continuous with at most a small transverse slit;
inserting a consumable, substantially annular, filler metal spacer ring around said non-consumable base metal ring and between the ends of the adjacent pipes, said consumable filler metal spacer ring being effectively continuous with at most a small transverse slit;
urging the adjacent pipe ends together and into contact with opposite faces of the consumable filler metal spacer ring; and
welding together the two pipe ends by supplying filler metal from said consumable spacer ring only in the resulting weld during a first root pass of a welding operation.

* * * * *